Patented Aug. 3, 1926.

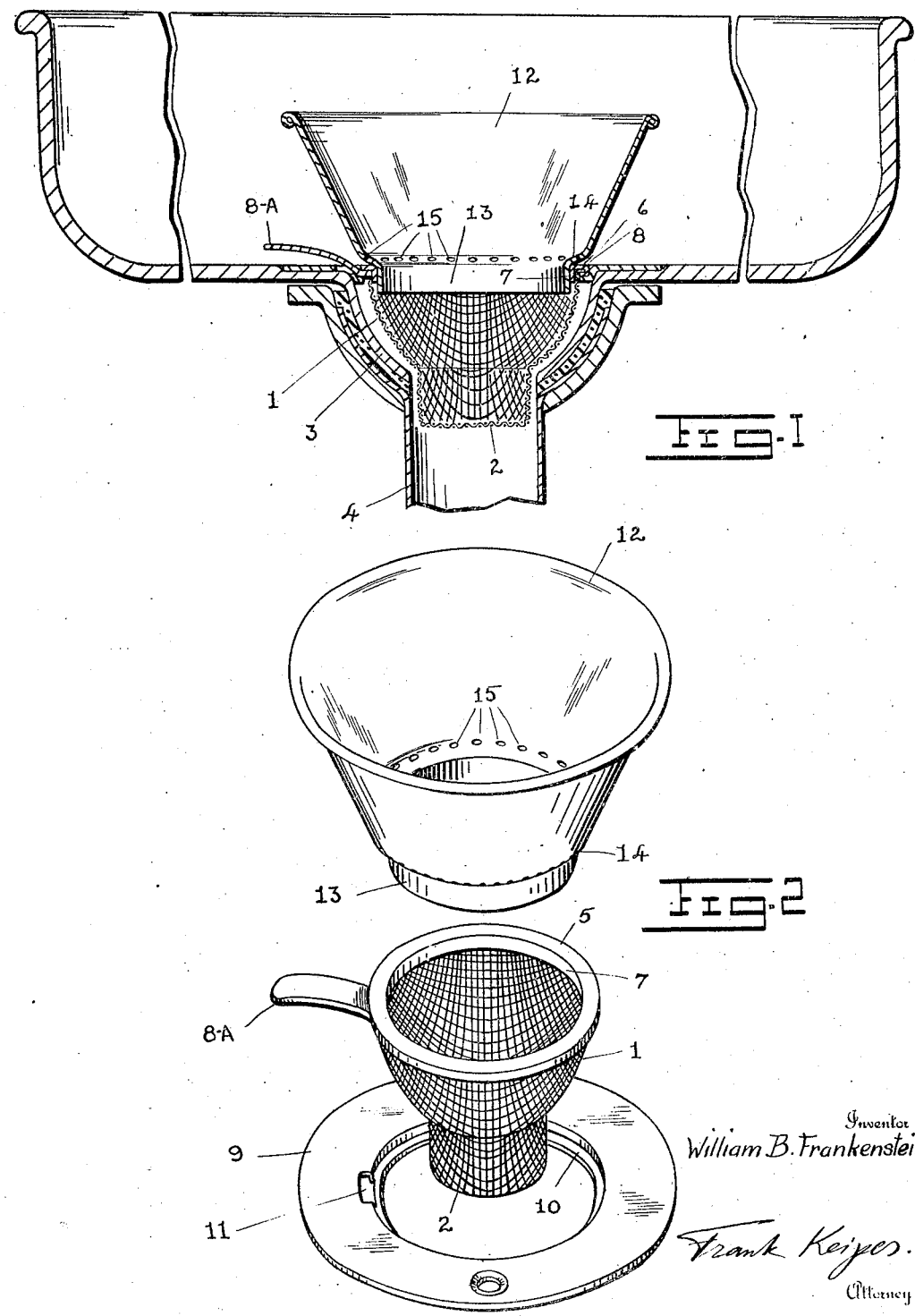

1,594,361

UNITED STATES PATENT OFFICE.

WILLIAM B. FRANKENSTEIN, OF ROCHESTER, NEW YORK.

SINK STRAINER.

Application filed April 19, 1926. Serial No. 102,874.

The object of this invention is to provide a new type of strainer for sinks, etc., one that can be readily removed from the drain outlet and cleaned.

Another object of this invention is to provide a strainer that can be supplemented with a funnel shaped auxiliary strainer that will prevent large refuse deposited in the sink from covering the strainer and interfere with the proper drainage of the water into the drain.

These and other objects of this invention will be fully illustrated in the drawing, described in the specification and pointed out in the claims at the end thereof.

In the accompanying drawing:

Figure 1 is a vertical sectional view of a portion of a sink and its outlet with the strainer mounted therein.

Figure 2 illustrates in detail perspective views the supporting plate, strainer and auxiliary strainer.

In the several figures like reference numerals indicate like parts.

The strainer forming the subject matter of my present invention is to prevent the outlet of a sink from clogging up by making the strainer readily removable from the outlet so that it can be kept clean at all times. The strainer is also supplemented with a funnel provided with an auxiliary strainer so that large pieces of refuse collecting in the sink cannot cover up the strainer proper but allow the water in which the refuse floats to drain into the strainer and out thru the outlet and keep the refuse in the sink where it can be collected and placed into a garbage receptacle.

As illustrated in the figures of the drawing the strainer 1 is cup shaped with a cylindrical extension 2 provided at the bottom thereof. The cup shaped portion as well as its cylindrical extension is adapted to be suspended in the outlet 3 of the sink which outlet is formed by a cup shaped depression slightly larger than the cup shaped portion of the strainer. The cup shaped portion of the outlet terminates into the outlet pipe 4 which has a slightly larger inside diameter than the outside diameter of the cylindrical extension 2 of the strainer 1. The strainer is centrally supported in the outlet by means of the suspension ring 5 which preferably comprises a flat ring 6 having a vertical flange 7 on the inside and a horizontal channel 8 formed around the outside into which the upper edge of the strainer engages and is held clamped in place therein. Extending from the ring is the handle 8ᴬ which slightly curves up so that it can be readily taken hold of when it is desired to lift the strainer out of the sink outlet.

For the purpose of firmly holding the strainer in place in the outlet of the sink the face plate or flange 9 which surrounds the outlet opening is provided with a cylindrical seat 10. This seat is depressed into the inner edge of the flange so that when the supporting ring of the strainer is placed into it, it rests therein flush with the top of the flange 9 as illustrated in section in Figure 1. The flange and its seat is notched at 11 to permit the inner end of the handle 8ᴬ to engage therein and hold the strainer against rotation on the flange 9.

For ordinary purposes the strainer so far described is sufficient to collect the refuse that would otherwise drain into the outlet and clog up the pipe or trap into which the pipe leads. When the refuse thus collected begins to interfere with the proper drainage of the water thru the strainer it is lifted out by means of its handle and emptied into a suitable garbage receptacle after which it is again placed into the outlet of the sink. As illustrated in section in Figure 1, space is provided between the inner wall of the drainage outlet and its pipe and the outer wall of the strainer. It is, therefore, not until the whole of the inside of the strainer is filled with refuse before the water is prevented from entering the outlet as even a small portion near the top of the strainer would be sufficient to allow the water to drain into the outlet and pass down between the inside wall of the outlet and its pipe and outer wall of the clogged up portion of the strainer.

To assist in collecting the refuse, especially the larger pieces, the strainer so far described is supplemented by the auxiliary funnel 12. This funnel has a short reduced neck 13 at the bottom which is adapted to telescope or nest into the ring 5 of the strainer. The shoulder 14 formed between reduced neck and body portion of the funnel rest on top of the ring and supports the funnel in a vertical position on top of the strainer and extends its inlet opening far above the bottom of the sink as illustrated in Figure 1. A series of small openings 15 are provided in the funnel near the bottom of the sink so that a small volume of water surrounding the funnel can enter the strainer thru these holes without having to pass thru the upper portion of the funnel.

The funnel 12 is used in connection with the strainer when large pieces of refuse are placed into the sink that are liable to cover the opening in the strainer and prevent the water from passing thru it. These larger pieces of refuse may collect around the funnel as the water is drained off into the outlet of the sink but they are unable to cover the holes in the funnel as the holes are located in a position in which the refuse floating on top of the water cannot get to them and cover them up. The walls of the funnel projecting above the strainer serve to restrain the flow of the water into the outlet of the sink because the openings restrict the volume of water that can enter into the strainer. Because of this the level of the water within the sink will rise to the top of the funnel and keep the refuse floating therein so that it can be readily fished out and placed into a garbage receptacle.

I claim:

1. In a strainer for sinks etc., the combination of a strainer having a cup shaped upper section and a reduced cylindrical lower section, a supporting ring surrounding the top of said strainer, a handle projecting from the periphery of said ring, a supporting flange, a seat formed on the inside of said flange, a notch in said flange extending from said seat, said supporting ring of said strainer being adapted to rest in said seat with said handle engaging into said notch to prevent the rotation of said strainer within said flange.

2. In a strainer for sinks etc., the combination of a strainer having a cup shaped upper section and a reduced cylindrical lower section, a supporting ring surrounding the top of said strainer, a handle projecting from the periphery of said ring, a supporting flange, a seat formed on the inside of said flange, a notch in said flange extending from said seat, said supporting ring of said strainer being adapted to rest in said seat with said handle engaging into said notch to prevent the rotation of said strainer within said flange, a funnel having an open top and bottom adapted to telescope into said supporting ring of said strainer, a short extension of reduced diameter forming an annular shoulder near the lower end of said funnel, said shoulder being adapted to support said funnel in an upright position in said strainer.

3. In a strainer for sinks etc., the combination of a strainer having a cup shaped upper section and a reduced cylindrical lower section, a supporting ring surrounding the top of said strainer, a handle projecting from the periphery of said ring, a supporting flange, a seat formed on the inside of said flange, a notch in said flange extending from said seat, said supporting ring of said strainer being adapted to rest in said seat with said handle engaging into said notch to prevent the rotation of said strainer within said flange, a funnel adapted to telescope into said supporting ring of said strainer, an annular shoulder formed on said funnel, said shoulder being adapted to support said funnel in an upright position in said strainer, said funnel having a series of holes near the shoulder formed thereon.

In testimony whereof I affix my signature.

WILLIAM B. FRANKENSTEIN.